United States Patent Office 3,068,133
Patented Dec. 11, 1962

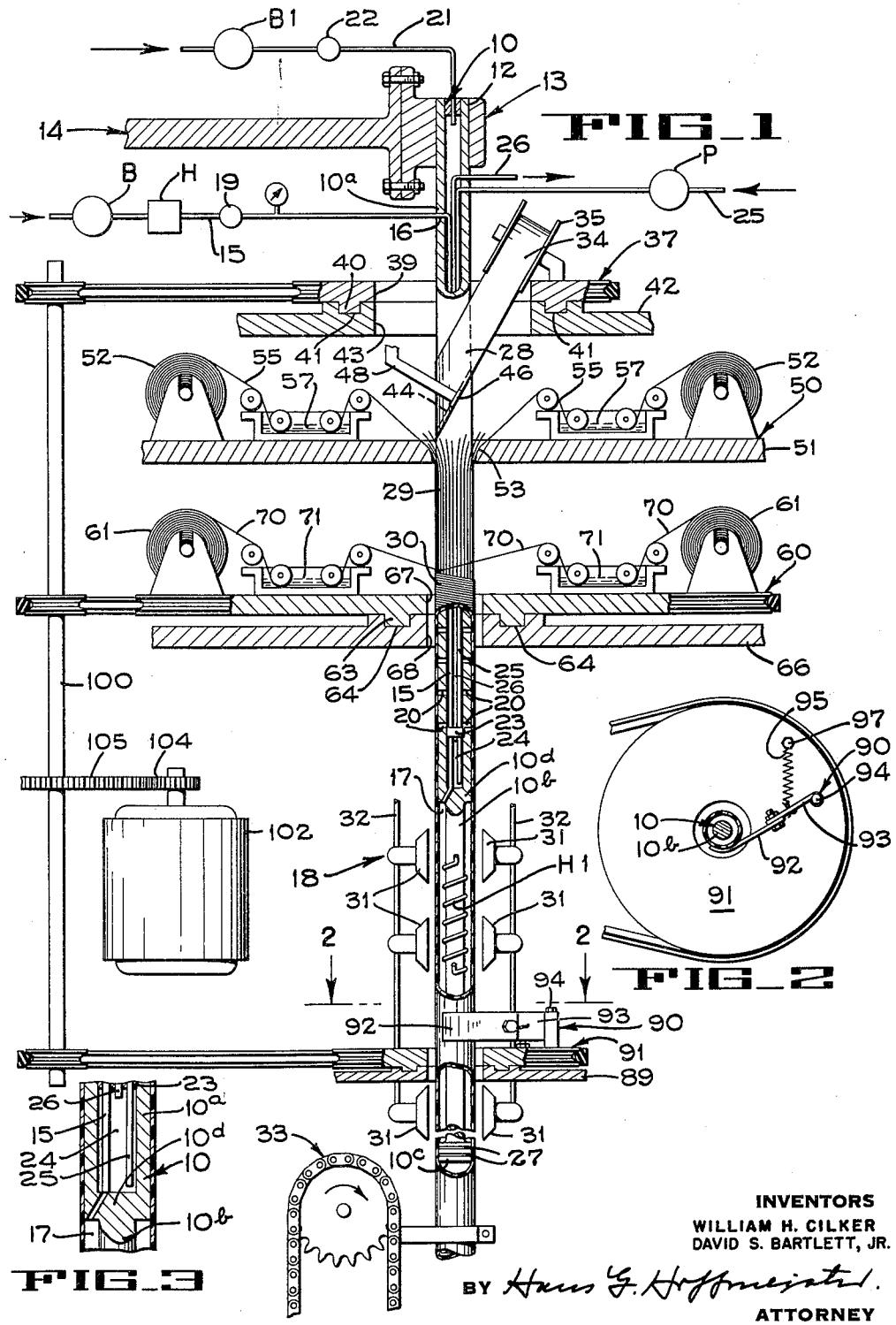

3,068,133
METHOD OF AND APPARATUS FOR MANUFACTURING A REINFORCED PLASTIC PRODUCT
William H. Cilker, Los Gatos, and David S. Bartlett, Jr., Santa Clara County, Calif., assignors to FMC Corporation, a corporation of Delaware
Filed Sept. 16, 1957, Ser. No. 684,266
18 Claims. (Cl. 156—171)

This invention relates to the manufacture of reinforced plastic products, and more particularly pertains to a method of forming a plastic pipe reinforced with glass fibers, and to an apparatus for carrying out the method.

In one method of making reinforced plastic pipe, the pipe is continuously formed on a cylindrical mandrel by wrapping a layer of liner material on the mandrel and then placing successive layers of resin-impregnated strands of glass fibers over the liner. As the pipe is progressively formed, and while the resin is in an uncured state, the pipe is pulled along the mandrel and directed through a zone where the pipe is subjected to heat to cure and harden the resin and cause the pipe to become rigid. If the liner is made of material which softens when subjected to heat, the liner becomes tacky as it approaches the heated curing zone, and tends to adhere to the mandrel. With this condition it is not only difficult to completely cure the pipe but it is also difficult to continue the movement of the pipe along the mandrel.

It is an object of the present invention to provide an improved method of forming a tubular plastic product on a mandrel.

Another object is to provide an improved method of moving a plastic pipe along a mandrel as the pipe is being formed.

Another object is to provide an improved method of curing plastic impregnated material as it is drawn along a cylindrical mandrel.

Another object is to provide an improved method of supporting a tubular plastic product while it is moved through a heat curing zone.

Another object is to provide an improved apparatus for curing a resin-impregnated article as it is formed on a mandrel.

Another object is to provide an improved machine capable of continuously forming reinforced plastic pipe on a cylindrical mandrel.

Another object is to provide improved means for moving a resin-impregnated article along a mandrel.

Another object is to provide means for processing the exterior surface of a plastic product while it is being cured.

Other and further objects and advantages of the present invention will become apparent from the following description taken in connection with the accompanying drawings, in which:

FIG. 1 is a schematic vertical section of an apparatus adapted to carry out the pipe making process of the present invention.

FIG. 2 is a fragmentary horizontal schematic sectional view taken on line 2—2 of FIG. 1.

FIG. 3 is an enlarged fragmentary schematic vertical section of a portion of FIG. 1, particularly showing a cooling chamber used in the apparatus of the present invention.

A machine for carrying out the method of the present invention is illustrated in FIG. 1 and comprises an elongated cylindrical tubular mandrel 10 made of metal, such as aluminum. At its upper end the mandrel 10 is secured in stationary position in any suitable manner in an aperture 12 of a bracket 13 that is bolted to a rigid support member 14. The mandrel 10 is of stepped configuration in that it comprises an upper tubular portion 10a, an intermediate reduced diameter, cylindrical rod portion 10b, and a lower cylindrical portion 10c which is of the same diameter as the upper portion 10a. A transverse wall 10d is formed between the upper portion 10a and the intermediate portion 10b. An air inlet pipe 15, which is connected to a suitable source of air under pressure, as for example a blower B, extends through an opening 16 in the side wall of the upper portion 10a of the mandrel 10, and projects downwardly through the mandrel and through the wall 10d and communicates with an annular space 17 around the reduced diameter portion 10b of the mandrel. As will be explained more specifically later on, as the pipe is moved over the reduced diameter portion 10b, it is supported by the pressurized air in the annular space 17 while the pipe is moved past a heated curing zone 18. It will be understood that a pressurized liquid, such as oil, may be used instead of air to support the pipe during curing. The pressure of the fluid may be varied by means of a manually operated pressure regulator 19. It has been found that a pressure of approximately five pounds per square inch is sufficient to support a pipe formed as shown in FIG. 1. For any pipe the pressure of the fluid should be sufficient to maintain the pipe in its true cylindrical form, and the pressure should not be so large as to cause the pipe to bulge or deform outwardly in any way. To aid in the curing of the resin, the fluid may be heated by a heater H through which the inlet line 15 extends. An electric heating coil H1, which may be connected by conventional means to a source of electric energy, is disposed around the mandrel portion 10b to maintain the desired temperature of air in chamber 17. It will be understood that, if a liquid is used, the blower B will be replaced by a suitable pump.

To facilitate the sliding of the pipe along the mandrel, air is directed against the inner surface of the pipe by means of a plurality of passages 20 which extend laterally through the wall of the mandrel. Pressurized air, which is supplied to the air tight core of the mandrel by an inlet conduit 21 at the upper end of the mandrel, flows through the lateral passages 20, exerts a pressure on the inner surface of the plastic pipe, and also works its way between the pipe and the outer surface of the mandrel to provide an air film on which the pipe slides. A variable capacity blower B1 and a manually operated pressure regulator 22 are connected in the conduit 21.

As the pipe approaches the heated curing zone it tends to get tacky and adhere to the mandrel. To eliminate this difficulty, the lower end of the core of the mandrel is sealed off by a closure member 23 to form a cooling chamber 24 therein. Water or other cooling fluid is circulated through the chamber 24 by means of a variable capacity pump P, an inlet pipe 25 and a discharge pipe 26. As seen in FIG. 3, the inlet pipe 25 extends downwardly to a point near the lower end of the chamber 24 while the discharge pipe 26 terminates near the upper end. When cooling fluid is circulated through the chamber, it cools the lower end of the mandrel which tends to become hot due to its proximity to the heated curing zone.

It will therefore be recognized that the air supplied through the lateral passages 20 and the fluid, which cools the lower end of the mandrel, reduces the frictional resistance between the pipe and the mandrel. Accordingly, the pipe can be pulled downwardly reliably by the pulling mechanism 33 through the cure zone.

The lower end of the pipe is guided by the lower portion 10c of the mandrel. Seal rings 27, which may take the form of well known metallic expansible piston rings, are disposed in grooves in the lower portion 10c of the mandrel to seal the lower end of the pressurized annular chamber 17.

A composite plastic pipe is produced by first forming a liner 28 of material, such as polyvinyl chloride, on the mandrel 10. Successive layers 29 and 30 of resin-impregnated continuous glass fiber roving are then applied over the liner 28. When the outermost layer 30 has been applied, the formation of the pipe is substantially complete. However the resin, which may be an epoxy resin treated with a curing agent or hardener, is distributed between the fibers of each layer and between adjacent layers in an uncured state. To cure the resin the pipe is drawn through a heating apparatus, which may be of any suitable type, as for example heated dies, or a battery of heating lamps 31 which are energized from conductors 32 connected to a suitable source of electrical energy. After the resin is cured, the rigid finished pipe is drawn off the lower end of the mandrel 10 by a pipe advancing mechanism 33, which also serves to progressivly slide the pipe, in its formative stage, downwardly along the mandrel.

The liner 28 is formed by unwrapping a ribbon 34 of thermoplastic material, such as polyvinyl chloride, from a spool 35 which is mounted for rotation on a turret 37. The turret has a central opening 39, and a depending annular flange 40 disposed in sliding engagement in an annular groove 41 in a stationary support member 42 which is provided with a central opening 43. As the turret 37 is rotated and the pipe is drawn downwardly along the stationary mandrel, the ribbon is wrapped in a helical manner on the mandrel with overlapping edges of the ribbon forming a seam 44. A heated iron 46 is arranged to contact the seam as it is formed to fuse and seal the overlapping edges of the ribbon. This iron may be heated in any well known manner, as by electrical conducting members embedded therein, and the iron may be mounted on a bracket 48 connected to an adjacent portion of the rotatable turret 37. With this arrangement a continuous sealed liner is formed on the mandrel. It will be evident that the thermoplastic liner material may be applied longitudinally, as well as helically.

The layer 29 is formed of longitudinally disposed glass fibers which are applied over the liner 28 by means of a dispensing unit 50 which includes a stationary support platform 51 on which a plurality of supply spools 52 are rotatably mounted. The support member 51 has an aperture 53 through which the mandrel 10 extends. A continuous strand 55 of glass fiber is unwound from each spool 52, directed through a bath 57 of liquid resin and then applied to the liner 28 with the fiber strands 55 disposed longitudinally on the mandrel. The fiber strands 55 are guided onto the liner 28 by rounded upper edges formed around the upper edge of the aperture 53 of the stationary member 51.

Glass fiber strands forming the layer 30 are placed over the layer 29 by a rotatable turret 60 on which a plurality of supply spools 61 are mounted for rotation. The turret 60 has a depending annular flange 63 disposed in sliding engagement in an annular groove 64 formed in a stationary support member 66. The turret 60 and the support member 66 have aligned openings 67 and 68, respectively, through which the mandrel 10 extends, the longitudinal axis of the mandrel being located on the axis of rotation of the turret 60. A continuous strand 70 of glass fiber is drawn from each spool 61, directed through a bath 71 of liquid resin, and applied to the layer 29. Since, at this stage in the formation of the pipe, the liner 28 and the layer 29 are being moved longitudinally along the surface of the mandrel 10 due to the pull of the pipe advancing mechanism 33 on the lower finished portion of the pipe and, since the turret 60 does not move longitudinally with the mandrel, the strands 70 of glass fiber will be wound helically on the layer 29 as the turret 60 is rotated.

It will, therefore, be apparent that when the pipe being formed reaches a position below the support member 66 it consists of a continuous liner 28, a layer 29 of longitudinally disposed fibers and a layer 30 of spirally wound fibers. It is to be understood that any desirable number or sequence of layers of longitudinally disposed or spirally disposed fibers, or layers of resin-impregnated glass fiber ribbon or mat may be formed in superposed relation on a liner to make up a pipe having a desired wall thickness and strength. Similarly, other fibrous material such as sisal, nylon, cotton and the like may be used. Although helical and longitudinal winding are shown in FIG. 1, any manner of positioning the layers on the mandrel or any other manner of forming a pipe on a mandrel may be used.

After the pipe is completely formed, it is directed through the zone between the heat lamps 31. The lamps 31 may be of any suitable commercial type and are disposed in uniform spaced relation entirely around the circumference of the reduced diameter portion 10b of the mandrel. These heat lamps are effective to cure that portion of the pipe surrounding the reduced diameter portion 10b of the mandrel, and, during this curing process, the tubular portion of the pipe in the heating zone is supported by pressurized air or liquid which is conducted to the annular chamber 17 by line 15. Other heating means may be used in the curing zone such as a heated oven.

Adjacent the lower portion of the heating zone a wiper device 90 is mounted on a turret 91 which is supported for rotation on a fixed member 89 and is disposed above the lowermost heat lamps 31. This wiper 90 is provided with a pad 92 (FIG. 2) which is adapted to contact the outer surface of the plastic pipe and effect a smoothening operation on the partially cured pipe in the heating zone. The pad 92 may be removably mounted on an arm 93 which is pivoted on a post 94 projecting upwardly from the turret 91. A tension spring 95 connected between the arm 93 and a pin 97 on the turret 91 is arranged to hold the pad 92 in engagement with the pipe. The pad 92 may be made of any suitable material, such as a stiff cloth fabric, which is capable of providing a smoothened surface on the pipe just prior to final curing of the pipe.

Besides sealing the annular chamber 17, the rings 27 have the additional function of forming the internal surface of the pipe to a particular diameter.

The turrets 37, 60 and 91 may be driven from a drive shaft 100 through suitable belt and pulley connections. A motor 102, which may be mounted in the usual manner on a support structure, is arranged to drive the shaft 100 through gears 104 and 105.

Although a machine having a substantially vertical mandrel has been described in connection with FIGURE 1, it is within the scope of the present invention to embody the features of the invention in a machine wherein the mandrel is disposed in a horizontal plane. To convert the vertical machine of FIG. 1 to a horizontal machine, only the means for impregnating the fibers with resin would have to be modified, as by providing a closed resin reservoir from which the resin cannot escape.

From the foregoing description it will be recognized that the present invention provides an efficient mechanism for continuously forming a tubular plastic product on a mandrel. The use of air or liquid pressure as a method of supporting the uncured pipe in the curing zone makes possible a machine in which the pipe will not stick to the mandrel. Further, the introduction of pressurized fluid at the lower end of the mandrel provides a lubricating film which increases the ability of the lower end of the plastic pipe to slide along the mandrel as the pipe approaches the heating zone and thereby provides further assurance that the pipe will not adhere to the mandrel.

The wiper unit 90 smoothens the surface of the partially cured pipe, eliminates surface blemishes, and imparts a smooth, sealed surface finish to the pipe.

It will be understood that modifications and variations may be effected without departing from the scope of the novel concepts of the present invention.

Having thus described my invention, what I claim as new and desire to protect by Letters Patent is:

1. A method of making continuous plastic pipe comprising the steps of disposing a plurality of layers of resin-impregnated material in superposed relation over a liner on a cylindrical mandrel to form a laminated tubular structure, continuously moving successive portions of the laminated structure out of supported engagement with the mandrel, and simultaneously subjecting the interior of the portion of the laminated structure that is unsupported by the mandrel to fluid under pressure and subjecting the exterior of the unsupported portion to heat to cure the resin in the resin-impregnated material and rigidify the structure.

2. A method of making a tubular plastic product comprising the steps of disposing a plurality of layers of resin-impregnated material in superposed relation over a liner on a rigid cylindrical mandrel to form a laminated tubular structure with the resin in the material in an uncured state, sliding a portion of the laminated structure to a point past the end of the cylindrical support surface of the mandrel, and forcing heated fluid under pressure into the interior of the portion of said structure to hold the structure that extends past the end of the cylindrical support surface of the mandrel in a tubular configuration and to assist the curing of the resin in the resin-impregnated material.

3. Apparatus for making a tubular plastic product comprising an elongated rigid mandrel of stepped configuration having a main support portion and a portion of reduced diameter, means for forming a liner on said main support portion, means for positioning a plurality of layers of resin-impregnated material over the liner to form a tubular structure, means for moving said structure with the resin in the material in an uncured state along said mandrel and over the reduced portion of said mandrel and in spaced relation thereto, and heat means disposed around said mandrel and to cure the resin in the resin-impregnated material as the structure is moved over said reduced portion.

4. Apparatus for making a tubular plastic product comprising a vertically disposed mandrel of stepped configuration having a main support portion and a portion of reduced diameter, means for progressively forming a tubular structure on the main support portion of said mandrel and sliding the tubular structure downwardly along said mandrel and over said reduced portion in spaced relation thereto, and means for conducting fluid under pressure to the space between said tubular structure and the reduced portion of said mandrel.

5. Apparatus for making a tubular plastic product comprising a rigid mandrel of stepped configuration having a portion of reduced diameter, means for forming a liner on said mandrel, means for positioning a plurality of layers of resin-impregnated material over the liner to form a tubular structure on said mandrel, means for moving said structure along said mandrel and over the reduced portion of said mandrel in spaced relation thereto, means for conducting fluid under pressure to the space defined between the internal surface of the tubular structure and the external surface of the reduced portion of said mandrel, and means for selectively varying the pressure of said fluid.

6. Apparatus for making a tubular plastic product comprising a mandrel of stepped configuration having a main portion and an elongated portion of reduced diameter, means for forming a tubular structure of plastic material on said mandrel, means for sliding the structure along the main portion of said mandrel and over said reduced diameter portion in spaced relation thereto, and means for conducting to the space between the structure and said reduced diameter portion a fluid at a pressure adapted to maintain the structure in its tubular configuration.

7. Apparatus for making a tubular plastic product comprising a rigid mandrel of stepped configuration having a main support portion and a portion of reduced diameter, means for forming a liner on said main support portion, means for positioning layers of resin-impregnated material over said liner to form a tubular structure, means for moving said structure with the resin in the material in an uncured state along said mandrel and over the reduced portion of said mandrel in spaced relation thereto, and means for directing heated and pressurized fluid into the space between the outer surface of said reduced mandrel portion and the inner surface of the tubular structure to heat and aid in curing the resin in the resin-impregnated material, the pressure of the fluid being sufficient to hold the structure in the tubular configuration into which it was formed on said mandrel.

8. Apparatus for forming a tubular plastic pipe comprising a rigid cylindrical mandrel having a main support portion, means defining a heated curing zone adjacent to and in alignment with an end of the main support portion of said mandrel, means for forming a tubular pipe structure on said mandrel and moving the structure along said main support surface and through said curing zone, and means for cooling the portion of said mandrel adjacent said curing zone.

9. Apparatus for making a tubular plastic product comprising a mandrel of stepped configuration having a first portion of a predetermined diameter and a portion of reduced diameter, means for forming a tubular structure of plastic material on said mandrel, means for moving the tubular structure along the mandrel and over said reduced diameter portion, a heating unit disposed in the annular space between the outer surface of said reduced diameter portion and the inner surface of the tubular structure, and means for conducting fluid under pressure to said annular space to be heated by said unit and to support the tubular structure as it is moved over said reduced diameter portion.

10. Apparatus for making a tubular plastic product comprising a mandrel of stepped configuration having a first portion of a predetermined diameter and a second portion of reduced diameter, the junction of said first and second portions providing a generally radial wall means defining a longitudinal passage in the first portion of said mandrel, said passage having an inlet leading externally of said second mandrel portion, means providing a lateral passage through the wall of said mandrel communicating with said longitudinal passage and having an outlet for conducting fluid externally of said reduced diameter portion of the mandrel, means for forming a tubular structure on said first portion of said mandrel, means for moving said structure along said mandrel and over said reduced diameter portion, and fluid conducting means disposed in the longitudinal passage of said mandrel and in flow communicaiton with the lateral passage in said wall for conducting pressurized fluid to the annular space formed between the reduced diameter portion of said mandrel and the inner surface of the tubular structure.

11. Apparatus for making a tubular plastic product comprising a mandrel of stepped configuration having a main support portion and a portion of reduced diameter, means for forming on said mandrel a tubular structure having a plurality of layers of material impregnated with a thermosetting resin, and means for subjecting both the inner and the outer surfaces of the tubular structure in the vicinity of said reduced mandrel portion to the action of a heating medium to cure the thermosetting resin in the material.

12. Apparatus for making a tubular plastic product comprising a hollow mandrel of stepped configuration having a main support portion, means defining a heated curing zone adjacent an end of said main support portion, means for forming a tubular plastic structure on said main support portion and sliding the structure along said mandrel and through said curing zone, means for directing air to the space between said mandrel and the inner surface of said plastic structure, means for varying the pressure and quantity of said air, means defining a cooling chamber in said mandrel adjacent said curing zone, means for circulating a cooling fluid through said cooling chamber, and means for varying the quantity of the cooling fluid flowing through the chamber.

13. In an apparatus for making a tubular plastic product, an elongated mandrel of stepped configuration having a first cylindrical portion of a predetermined diameter and a second cylindrical portion adjacent said first portion and having a reduced diameter, means defining a passage extending longitudinally through the first cylindrical portion of said elongated mandrel and leading to the exterior of said portion of reduced diameter, and means for directing fluid under pressure through said passage.

14. In an apparatus for forming a tubular plastic product, an elongated mandrel of stepped configuration having a first cylindrical portion of a predetermined diameter, a second cylindrical portion spaced from said first portion, and a reduced diameter portion between said first and second portions; means defining a conduit extending longitudinally through the first cylindrical portion of said elongated mandrel and leading to the exterior of said reduced diameter mandrel portion; means for directing fluid under pressure through said conduit; and means for heating said fluid.

15. A method of making a tubular plastic product comprising the steps of forming a laminated tubular structure having a plurality of superposed layers of resin-impregnated material, directing fluid under pressure to the interior of and into direct contact with the inner surface of a length of the laminated tubular structure, said fluid being at a pressure sufficient to provide the sole means for maintaining the tubular configuration of said length of the laminated tubular structure, and curing the resin in said length of the laminated tubular structure while said length is subjected to the expansive force of the pressurized fluid.

16. A method of making a tubular plastic product comprising the steps of disposing a plurality of layers of resin-impregnated material in superposed relation over a liner to form a laminated tubular structure with the resin in the material in an uncured state, conducting a fluid under pressure to the interior of and into direct contact with the inner surface of a length of the laminated tubular structure, the pressure of said fluid being sufficient to maintain the tubular configuration of said length, and subjecting the exterior of said length of the laminated tubular structure to heat to cure the resin and solidify the structure while the heated length of laminated tubular structure is maintained in tubular form solely by the direct contact of the pressurized fluid with the inner surface of said length of the structure.

17. Apparatus for making a tubular plastic product comprising an elongated mandrel of stepped configuration having a main support portion and a portion of reduced diameter, means for forming a tubular plastic structure on said main support portion and sliding the structure along said mandrel and over said reduced portion in spaced relation thereto, means defining a fluid conduit in said mandrel, said conduit having an inlet and an outlet in communication with the annular space between the outer surface of the reduced portion of the mandrel and the inner surface of the tubular structure, and means for supplying heated and pressurized fluid to said conduit inlet, through the conduit, and out the conduit outlet into said annular space.

18. A mandrel for making a tubular laminated product embodying material that tends to adhere to the mandrel, said mandrel being of stepped configuration and having a main support portion for the tubular product and a portion of reduced diameter for clearing the product as it passes thereover, and means in said main support portion defining a fluid passage in said mandrel leading to the exterior of said portion of reduced diameter for supplying a product distending fluid between said reduced diameter portion and the portion of the product that is disposed over said reduced mandrel portion.

References Cited in the file of this patent
UNITED STATES PATENTS

| | | |
|---|---|---|
| 864,168 | Hinsky | Aug. 27, 1907 |
| 1,034,915 | Kaiser | Aug. 6, 1912 |
| 1,047,946 | Jenkins | Dec. 24, 1912 |
| 1,716,505 | Robinson | June 11, 1929 |
| 2,247,197 | Graves | June 24, 1941 |
| 2,402,038 | Goldman et al. | June 11, 1946 |
| 2,486,763 | Roberts | Nov. 1, 1949 |
| 2,502,638 | Becht | Apr. 4, 1950 |
| 2,532,501 | Johnson | Dec. 5, 1950 |
| 2,723,426 | Pelley | Nov. 15, 1955 |
| 2,723,705 | Collins | Nov. 15, 1955 |
| 2,731,070 | Meissner | Jan. 17, 1956 |
| 2,760,549 | Nash et al. | Aug. 28, 1956 |
| 2,760,896 | Nash | Aug. 28, 1956 |
| 2,829,699 | Pazan | Apr. 8, 1958 |